(12) United States Patent
Kroll et al.

(10) Patent No.: US 6,481,549 B2
(45) Date of Patent: Nov. 19, 2002

(54) HYDRODYNAMIC CONVERTER INCLUDING OVERRUNNING CLUTCH AND STATOR

(75) Inventors: Jürgen Kroll, Ketsch (DE); Rolf Köstel, Bruchsal (DE)

(73) Assignee: BorgWarner, Inc., Troy, MI (US)

( * ) Notice: Subject to any disclaimer, the term of this patent is extended or adjusted under 35 U.S.C. 154(b) by 58 days.

(21) Appl. No.: 09/801,462

(22) Filed: Mar. 8, 2001

(65) Prior Publication Data

US 2001/0023805 A1 Sep. 27, 2001

(30) Foreign Application Priority Data

Mar. 8, 2000 (DE) .......................... 100 11 237

(51) Int. Cl.[7] .............................................. F16D 43/00
(52) U.S. Cl. ................................. 192/41 R; 192/41 A
(58) Field of Search ........................... 192/3–34, 41 R, 192/41 A, 45.1; 310/92

(56) References Cited

U.S. PATENT DOCUMENTS

| | | | |
|---|---|---|---|
| 5,094,076 A | | 3/1992 | Henricks |
| 5,122,104 A | | 6/1992 | Ohkubo |
| 5,125,487 A | * | 6/1992 | Hodge ........................ 192/3.34 |
| 5,518,368 A | | 5/1996 | Egert |
| 5,760,514 A | * | 6/1998 | Taniguchi et al. ............. 310/92 |
| 5,779,014 A | * | 7/1998 | Kinoshita et al. .......... 192/45.1 |
| 5,881,556 A | | 3/1999 | Matsuoka |
| 6,093,478 A | | 7/2000 | Jasinetzky et al. |

* cited by examiner

Primary Examiner—Christopher P. Schwartz
(74) Attorney, Agent, or Firm—Pendorf & Cutliff; Greg Dziegielewski

(57) ABSTRACT

The invention concerns a sub-assembly of a hydrodynamic converter which is comprised of an overrunning clutch with bearing rings, a stator of with integrated overrunning clutch outer ring, as well as two thrust bearings.

The invention is identified by the following characteristics:

- the overrunning clutch has one or two cages and two bearing rings;
- the overrunning clutch has an overrunning clutch inner ring;
- the overrunning clutch has an overrunning clutch outer ring;
- the stator consists of glass reinforced plastic and is manufactured in an injection process;
- the stator is injected around the overrunning clutch outer ring during the injection process, so that it encompasses this—seen in axial section—in a U shape;
- each of the thrust bearings are arranged on axially opposite surfaces of the material surrounding the overrunning clutch outer ring.

16 Claims, 5 Drawing Sheets

HYDRODYNAMIC CONVERTER INCLUDING OVERRUNNING CLUTCH AND STATOR

BACKGROUND OF THE INVENTION

1. Field of the Invention

The invention concerns a sub-assembly of a hydrodynamic converter, comprising an overrunning clutch, a stator, and thrust bearings.

2. Description of the Related Art

Many devices are known, in which a hydrodynamic converter is provided with at least one overrunning clutch. The overrunning clutch is associated with the stator of such a converter. Reference may be made to DE 36 04 393 C2 by way of example.

In the automobile industry here is a constant demand for decreasing the weight of components as well as component space. At the same, there is a striving for decreasing costs, as well as simplifying and streamlining operations, especially for assembly and disassembly of such components.

It is common to manufacture stators of hydrodynamic converters from injection molded aluminum and to structurally combine them with the overrunning clutch. In this case, the overrunning clutch outer ring is structurally interlocked with the stator. The overrunning clutch outer ring must be hardened and its surface must be machined with very exacting tolerances.

This common form of assembly has many disadvantages. Machining the overrunning clutch outer ring that is integrated in the stator is time-consuming and expensive. The weight of the assembly is not yet optimal, despite use of aluminum as an alloy. The deficiency leaves much to be desired.

SUMMARY OF THE INVENTION

The invention is based on the task of creating an assembly of the above-mentioned type in such a manner that the manufacturing costs are decreased, the number of components is diminished, and so that the assembly is easier to work with.

This task is accomplished by the characteristics of claim 1. In accordance therewith the inventors chose a material for the stator of a hydrodynamic converter that has the necessary sturdiness, toughness and heat resistance: namely glass fiber reinforced plastic. For this they preferred a semi-crystalline polyamide with a temperature resistance of 170° C. or more, and a peak temperature resistance of 200° or more.

The entire machined overrunning clutch outer ring is integrated in the stator, in that it is formed by injecting the mentioned material around the overrunning clutch outer ring. Refinishing the overrunning clutch outer ring is not necessary when using the above-mentioned materials, since the injection temperatures do not need to be so high that the effect of the hardening of the outer ring is lost again. In contrast, refinishing is necessary in every case when the stator is made of aluminum, since the injection temperatures are significantly higher.

The material mentioned also holds up to the mechanical demands. It proved to be excellent for transferring considerable torque.

The stator is mounted radially on the overrunning clutch outer ring towards the overrunning clutch inner ring using two U-shaped disks of bronze coated sheet steel. The assembly additionally has two thrust bearings. The one bearing receives a relatively high axial load in the torque conversion process. Therefore, for functional reasons, this bearing is a needle bearing. The needle bearing can be in form-fitting or force-fitting engagement with the stator. At the same time, the overrunning clutch is axially retained by the slide bearing of the needle bearing. The other bearing, located on the opposite side of the assembly, is less stressed. It can be implemented as a slide bearing, and is therefore a component of the injection molded part, and therefore of the stator. Through design configuration, the stator assembly can be implemented as a self contained, pre-assembled unit without loose individual parts.

Important benefits are as follows:

The assembly can be manufactured more cost-effectively, since machining of the overrunning outer ring is no longer necessary after integration in the stator. The cost of the stator is reduced by the selection of the plastic material, in comparison to those made according to conventional technology. In comparison to common executions, the weight is significantly decreased with aluminum. The complexity of the stator assembly is reduced in comparison to the conventional technology. The assembly can be delivered and assembled as a self-contained unit without individual pieces.

BRIEF DESCRIPTION OF THE DRAWINGS

The invention is further explained in the figures. The following details are represented.

DETAILED DESCRIPTION OF THE INVENTION

Figure 1:
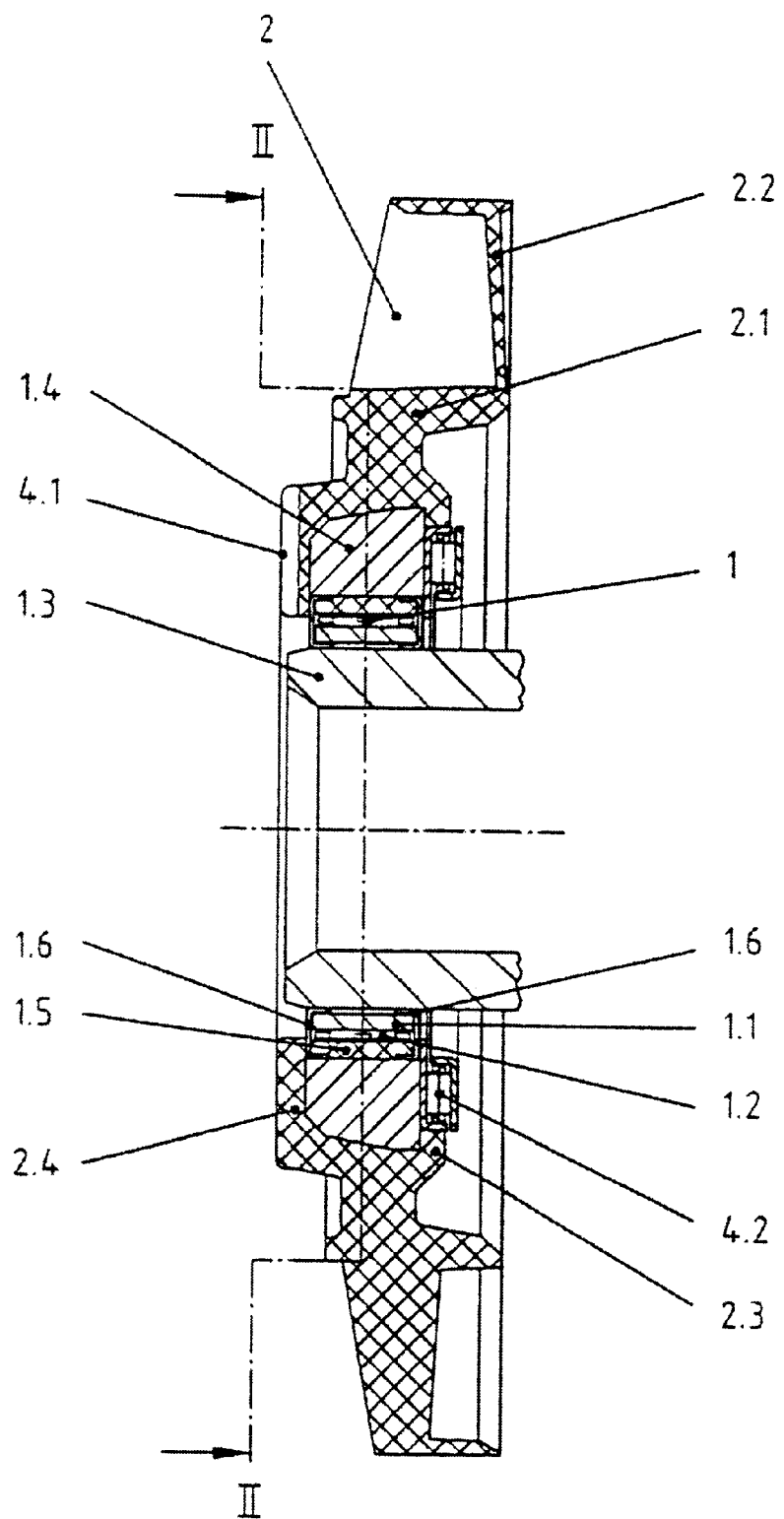
FIG. 1 shows an assembly in axial section, based on the invention.
Figure 2:
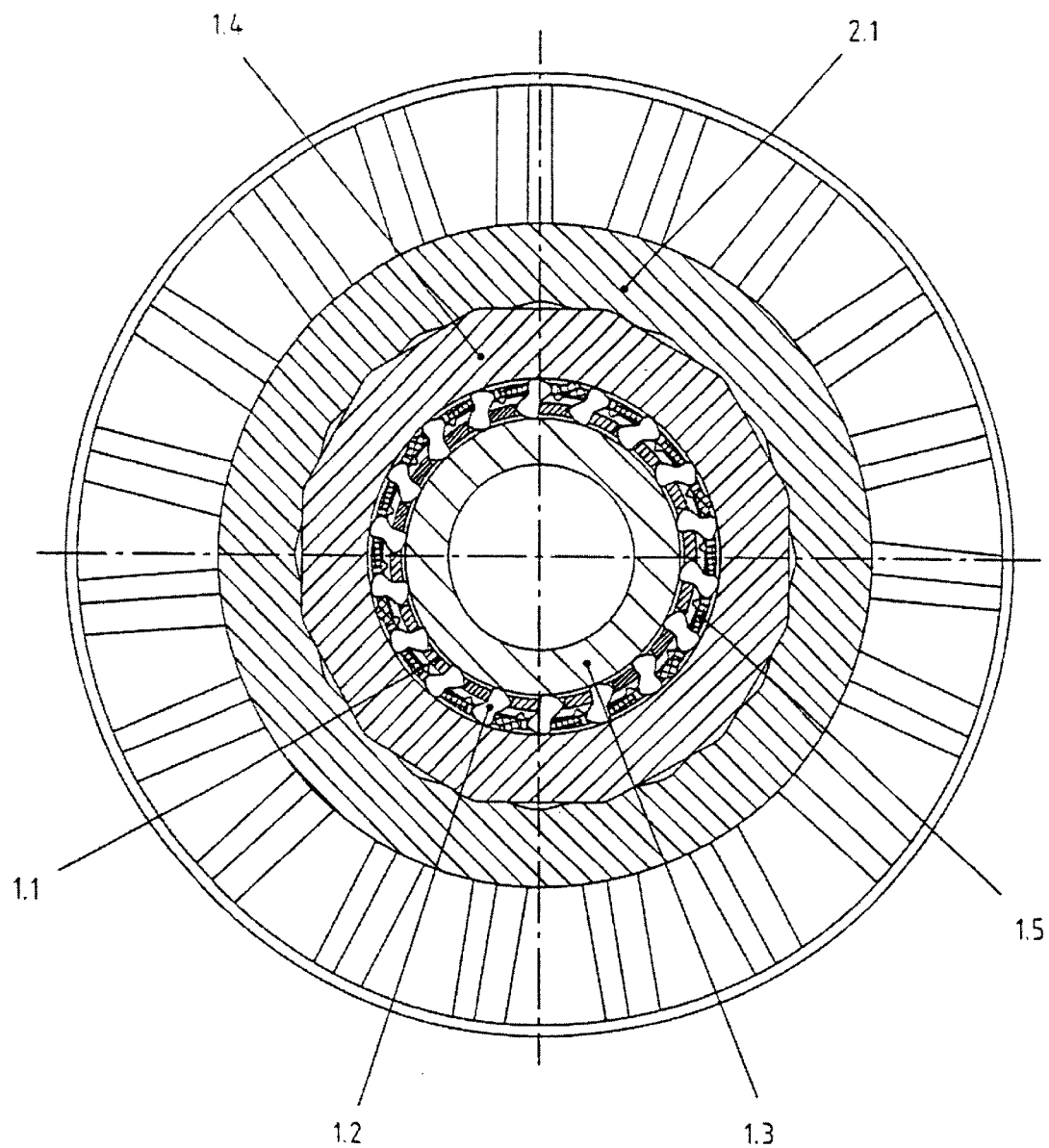
FIG. 2 shows the assembly of FIG. 1 in a cross section along section line II-I.
Figure 3:
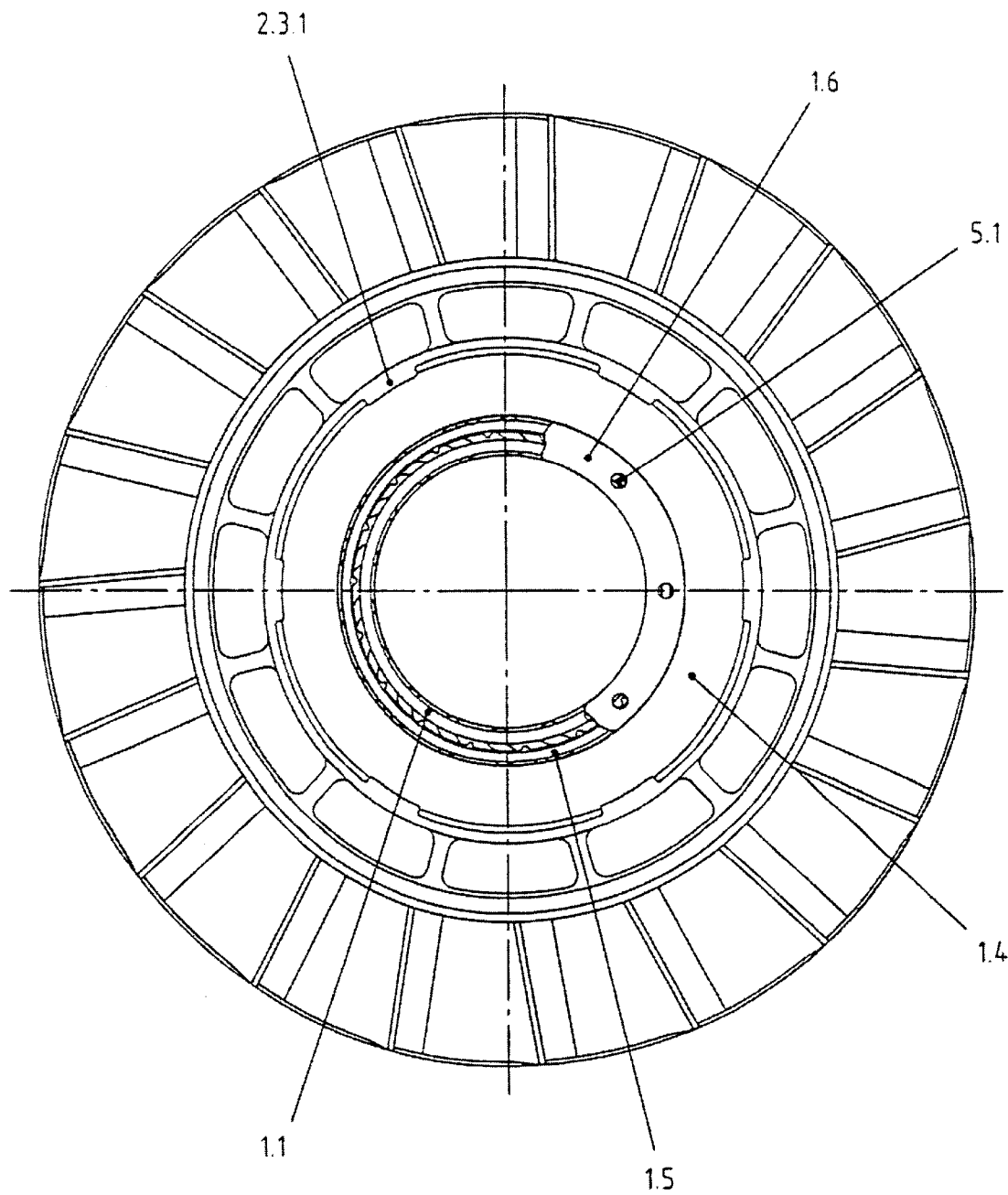
FIG. 3 shows the object from FIG. 1 viewed from above in direction of arrow A.

The assembly includes an overrunning clutch 1. This comprises an inner cage 1.1, an outer cage 1.5, numerous sprags 1.2, two bearing rings 1.6, an overrunning clutch inner ring 1.3 and an overrunning clutch outer ring 1.4. The overrunning clutch outer ring has an outer contour which deviates from a cylindrical shape. The overrunning clutch inner ring is part of a shaft, as depicted. However, it can also be executed as a separate part, torsionally fixed with such a shaft.

Stator 2 of the torque converter, which is completely made of plastic material, comprises a ring 2.1 with a collar of blades 2.2. This ring 2.1 is interlocked with the non-cylindrical contour of the overrunning clutch outer ring 1.4 by injecting molding around the overrunning clutch outer ring. A torsionally fixed connection is insured through this interlocking. At the same time the overrunning clutch outer ring is thereby prevented from axially drifting relative to the stator.

The interlocking connection of the axial needle bearing 4.2 to the stator 2 is realized by the design of ring 2.1. The design described here achieves very exact centering of all critical components.

Figure 4:
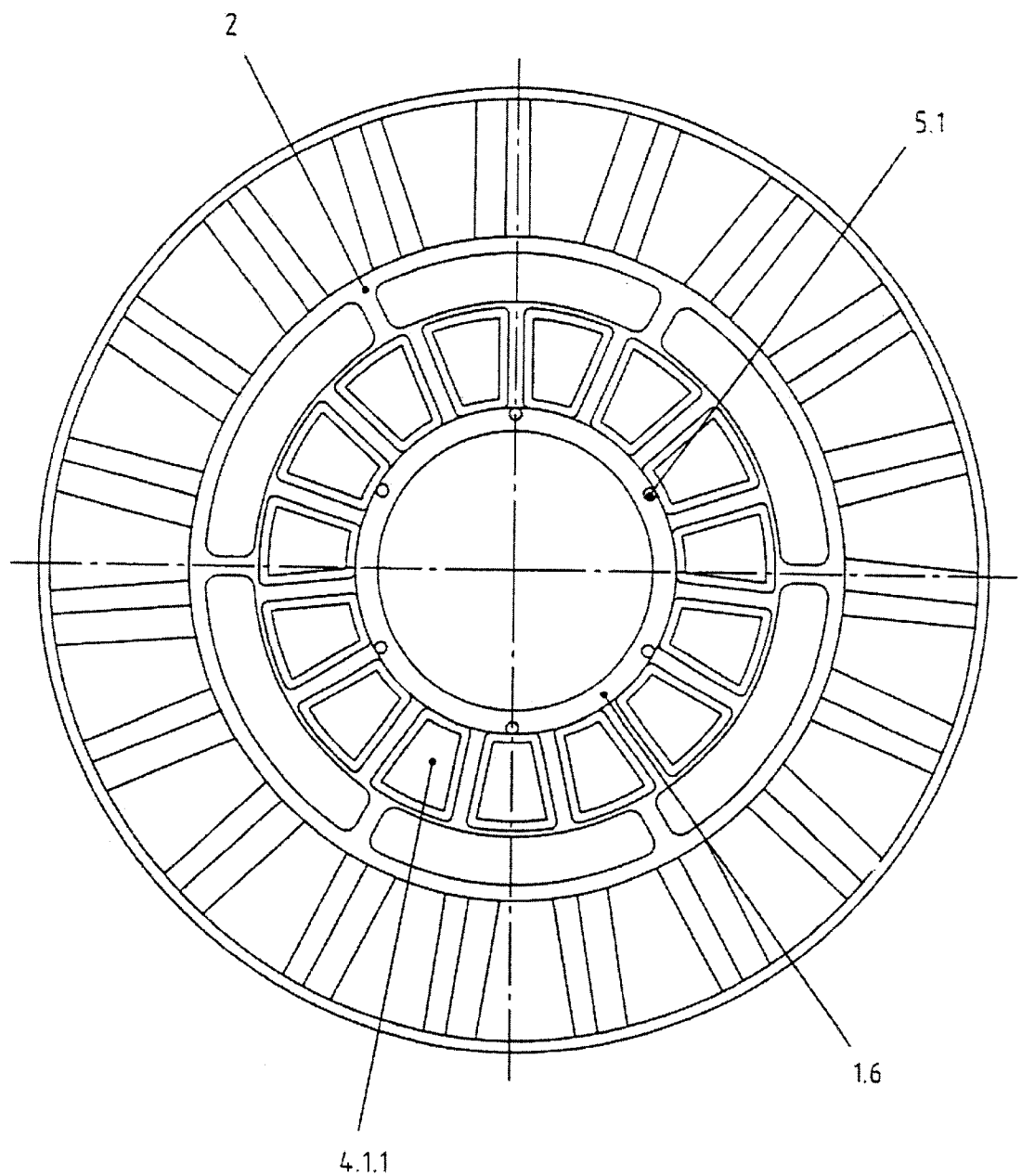
FIG. 4 shows the object from FIG. 1 viewed from above in direction of arrow B.
Figure 5:
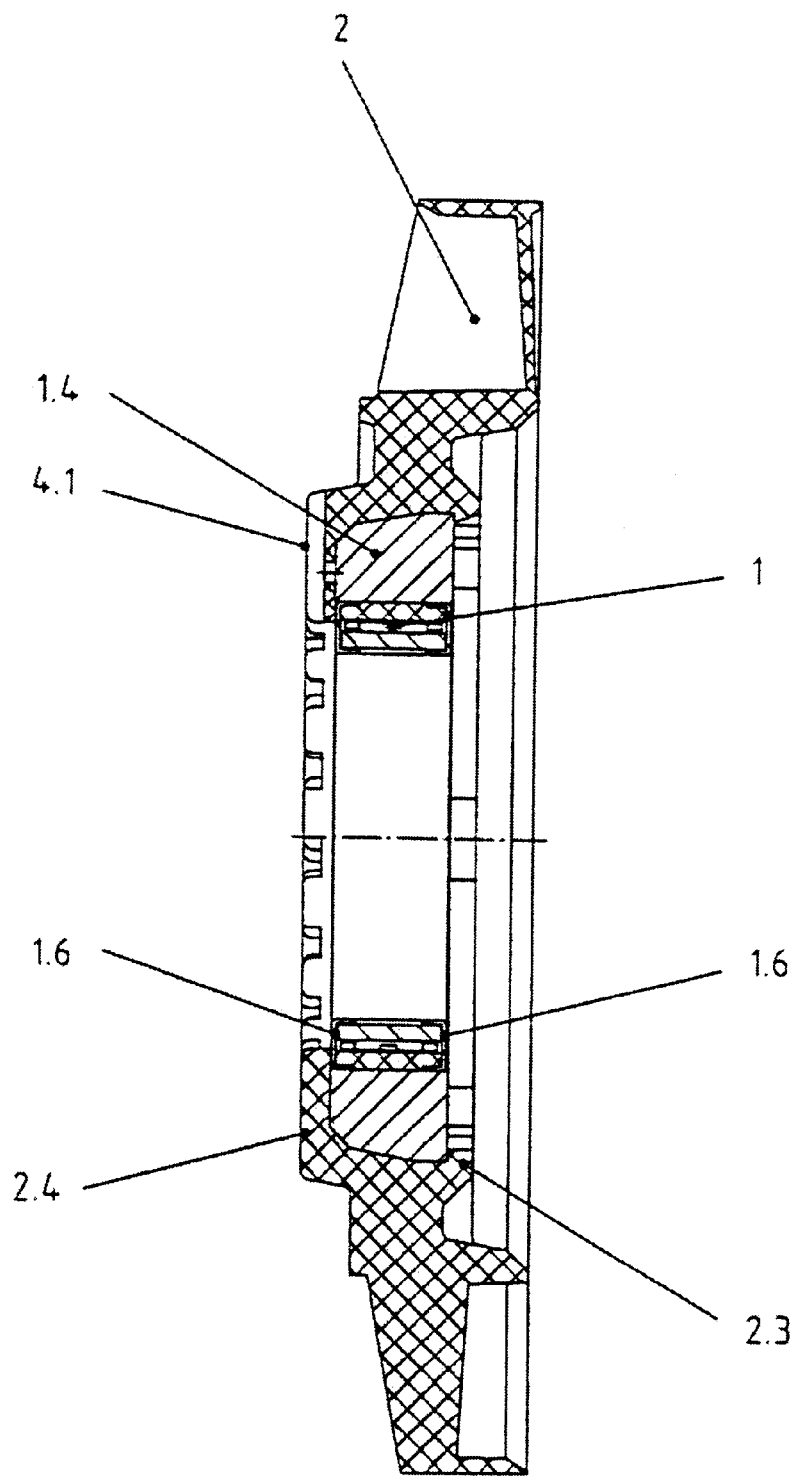
FIG. 5 shows the object from FIG. 1 without inner ring 1.3, without needle bearing 4.2.

As FIGS. 1 and 4 show, one slide bearing 4.1 is located on the side of the assembly that receives hydraulic flow. This is a unitary part with the stator 2. Therefore, it is manufactured with the rest of the stator 2 during injection molding. See segment 4.1.1 with the groove located in between, in which oil flows during operation for cooling purposes.

Bearing rings 1.6 have bores 5.1, through which oil flows in order to lubricate overrunning clutch 1.

Instead of the embodiment described here, it is also possible to inject ring 2.1 around the needle bearing 4.2 during the injection process, so that in this manner it becomes a fixed component of the assembly.

The figures refer to a sprag clutch. However, the invention is also applicable to other overrunning clutch types, for example one way roller clutches or ratchet clutches.

What is claimed is:

1. Sub-assembly of a hydrodynamic converter, comprising:
    an overrunning clutch (1) including
       an overrunning clutch inner ring (1.3),
       an overrunning clutch outer ring (1.4) having first and second axial surfaces, and
       a bearing unit provided between said inner and outer ring and including bearings or sprags, said bearings or sprags positioned relative to each other by an inner cage (1.1) and an outer cage (1.5), and said bearings or sprags retained axially between two bearing rings (1.6);
    a stator (2); and
    two thrust bearings (4.1, 4.2), axially bracketing the overrunning clutch outer ring (1.4),
    wherein the stator (2) consists of glass reinforced plastic and is manufactured in an injection process during which the stator (2) is injected directly onto the overrunning clutch outer ring (1.4), forming an engaging U shape when viewed in axial section.

2. Sub-assembly as in claim 1,
    having material (2.4), which encloses the overrunning clutch outer ring (1.4) on the one axial surface, and extends radially inwardly to the area of one overrunning clutch bearing ring (1.6); and
    having material (2.3) enclosing the overrunning clutch outer ring (1.4) on the other axial surface which extends radially inwardly to the area of the overrunning clutch outer ring (1.3).

3. The sub-assembly as in claim 2,
    wherein the material (2.3) covering the overrunning clutch outer ring (1.4) on the one surface, which extends radially inwardly into to the area of the overrunning clutch outer ring (1.3) is on the side of the stator (2) which is acted upon hydraulically,
    wherein said material (2.3) enclosing the overrunning clutch outer ring (1.4) on the one axial surface includes—seen from above—a number of projections (2.3.1), between which there are grooves, and
    wherein the projections (2.3.1) extend radially inwardly as far as the outer ring (1.4) of the overrunning clutch (1.1), and only partially cover its axial surface.

4. The sub-assembly as in claim 2, wherein two additional steel disks (5) are arranged for housing the needle bearing (4.2).

5. Sub-assembly as in claim 1, wherein one of said thrust bearing (4.2) opposite a side of the stator (2) which is acted upon hydraulically is a needle bearing.

6. The sub-assembly as in claim 7, wherein the needle bearing (4.2) is in position during the injection process, and is therefore enclosed by the material (2.3) enclosing the overrunning clutch outer ring (1.4) on the one front surface.

7. The sub-assembly as in claim 1, wherein one of said thrust bearings (4.1) which is on a side of the stator (2) which is acted upon hydraulically is a slide bearing formed unitarily with the stator (2).

8. The sub-assembly as in claim 1, wherein one of said thrust bearings (4.1) which is on a side of the stator (2) which is acted upon hydraulically is a slide bearing torsionally fixed with the stator (2).

9. The sub-assembly as in claim 1, wherein the outer ring (1.4) of the overrunning clutch 1 is manufactured structurally interlocked with the stator (2).

10. The sub-assembly as in claim 1, wherein the outer circumference of outer ring (1.4) of the overrunning clutch 1 is non-cylindrical.

11. The sub-assembly as in claim 1, wherein the plastic is a semi-crystalline polyamide.

12. The sub-assembly as in claim 1, wherein the overrunning clutch outer ring is formed of aluminum or an aluminum alloy.

13. The sub-assembly of a hydrodynamic converter, comprising:
    an overrunning clutch (1) including
       an overrunning clutch inner ring (1.3) and
       an overrunning clutch outer ring (1.4) mounted for rotation about said overrunning clutch inner ring (1.3) in at least one direction; and
    a stator (2),
    wherein said overrunning clutch outer ring (1.4) is formed of aluminum or an aluminum alloy,
    wherein said stator (2) is formed of glass reinforced plastic,
    wherein said stator (2) is manufactured in an injection molding process during which the stator (2) is injected directly onto the overrunning clutch outer ring (1.4), forming an engaging U shape when viewed in axial section, and
    wherein said manufacturing process involves no refinishing of said overrunning clutch outer ring (1.4) following said injection molding of said stator.

14. The sub-assembly of a hydrodynamic converter as in claim 13, wherein said overrunning clutch inner ring (1.3) has an exterior cylindrical surface, wherein said overrunning clutch outer ring (1.4) has an interior cylindrical surface, and wherein sprags or roller bearings are provided between said cylindrical surfaces.

15. The sub-assembly of a hydrodynamic converter as in claim 14, wherein said sprags or roller bearings are axially positioned between first and second bearing rings.

16. The sub-assembly of a hydrodynamic converter as in claim 13, wherein prior to said injection molding process said overrunning clutch outer ring (1.4) and at least one axial thrust bearing (4.1, 4.2) are placed in a mold, and wherein said glass reinforced plastic is injected onto said mold and onto said overrunning clutch outer ring (1.4) and at least one axial thrust bearing (4.1, 4.2).

\* \* \* \* \*